May 19, 1931. F. G. ARNOLD 1,806,380
PRESSURE GAUGING TIRE VALVE
Filed Oct. 15, 1929

INVENTOR
Frank G. Arnold
BY
Victor J. Evans
ATTORNEY

Patented May 19, 1931

1,806,380

UNITED STATES PATENT OFFICE

FRANK G. ARNOLD, OF NEW YORK, N. Y.

PRESSURE GAUGING TIRE VALVE

Application filed October 15, 1929. Serial No. 399,824.

This invention relates to improvements in tire valves and its leading object is to provide a tire valve with a pressure gauge including a pressure responsive indicating tube, and an air releasing spring rod working through this gauge, by the manipulation of which the air may be allowed to be discharged, when it is desired to deflate the tire, and which will yield inwardly under the influence of air pressure employed to inflate the tire.

A further object of the invention is the provision of a combined tire valve and pressure gauge with means for sealing the movable parts against air leakage.

Other objects and advantages of the invention will be hereinafter specifically pointed out, or will become apparent, as the specification proceeds.

With the above indicated objects in view, the invention resides in certain novel construction and combination and arrangement of parts, clearly described in the following specification and fully illustrated in the accompanying drawings, which latter shows an embodiment of the invention as at present preferred.

Figure 1:
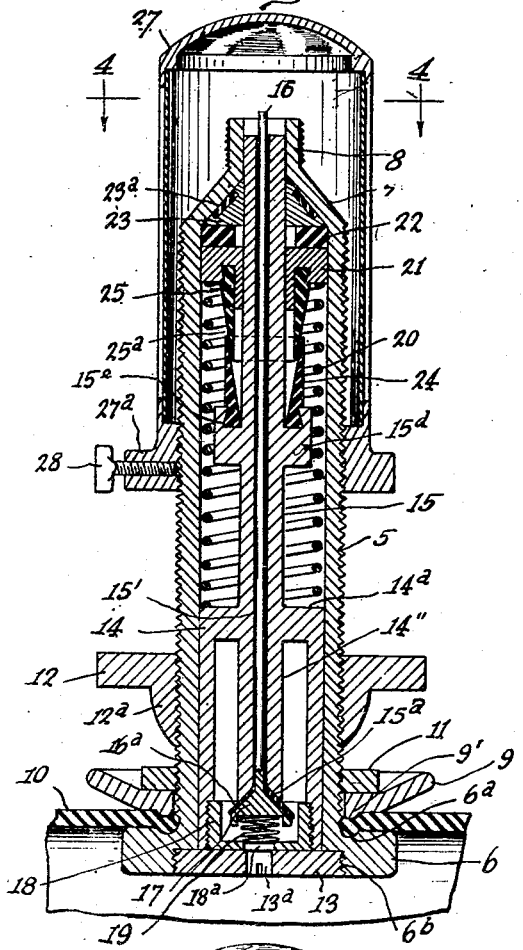
Fig. 1 is a vertical sectional view through a combined air valve for tires and pressure gauge.
Figure 2:
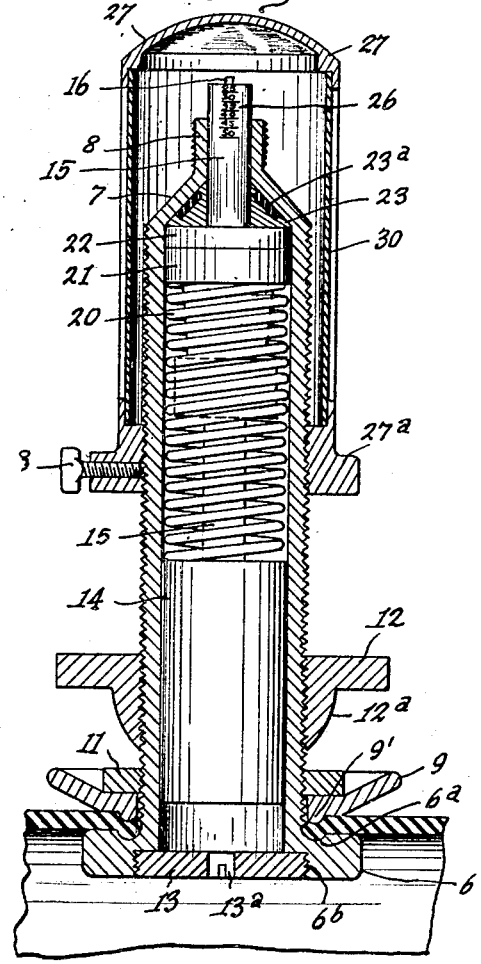
Fig. 2 is a similar view, with certain sliding parts shown in elevation.
Figure 3:
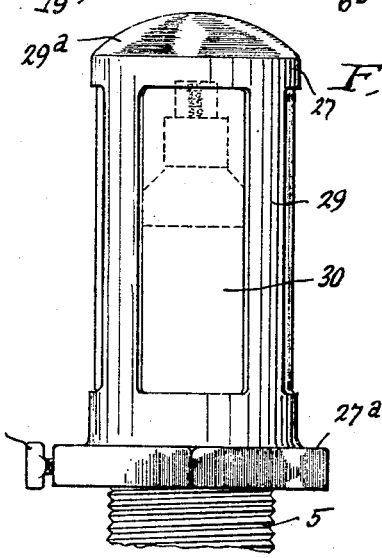
Fig. 3 is a view in elevation.
Figure 4:
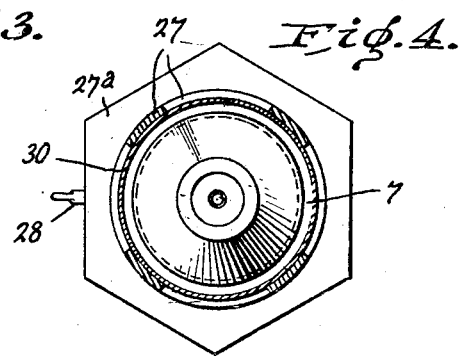
Fig. 4 is a cross sectional view, taken on line 4—4 of Fig. 1, looking in the direction of the arrows.

Referring to the accompanying drawings in detail 5 designates a cylindrical tube formed with an integral base flange 6, which is provided with an encircling groove 6a on its outer side, and with an internally threaded recess 6b on its bottom side. This tube is formed with an external thread 5a, which extends the length thereof, while the upper end of the tube is reduced by a conical extension 7, which terminates in a normally open circular nipple 8.

A dished washer 9 is disposed around the tube 5 and is formed with an inwardly offset portion 9' which is designed to force the elastic rubber wall 10 of the inner tube into the groove 6a of the base 6. This washer is held in compressing relation to the rubber wall 10 by means of the lock nut 11. A nut 12 having a conical boss 12a is also threaded on the tube 5 to clamp a wheel rim against the lock nut and washer.

A metal disc 13 is threaded in the recess 6b and is provided with a central air port or aperture 13a. Over this disc the pressure responsive tubular plunger 14 is mounted to slide inside the smooth bore wall of the tube 5. This plunger is formed with a central integral post 15, the lower end of which is formed with a conical seat 15a. The conical valve 17 on the stem 16 is arranged to engage the rubber gasket 16a disposed on the seat 15a. This stem 16 has a loose sliding fit in the central passage 15' of the post 15, and said stem extends above the upper end of the post 15, to be manipulated by hand when it is desired to deflate the tire.

A bushing 18 is threaded to the lower end of the tubular plunger 14, and is provided with a central air port or aperture 18a which is normally open and which registers with the port or aperture 13a of the disc 13. A coil spring 19 is disposed between the valve 17 and the base of the bushing 18, and exerts tension against the valve to hold the same seated against leakage against the gasket 16a, which is thereby held seated against leakage against the seat 15a of the central post 15 of plunger 14.

The tubular outer wall of the plunger 14 is enlarged at its upper end to provide a shoulder 14a against which the coil spring 20 bears at its lower end.

The upper end of the coil spring engages the sleeve 21, which is held by the tension of the spring 20 against the soft rubber washer 22, which engages the conical plug 23 nested in the conical extension of the tube 5. This plug 23 is provided with a central opening through which the post 15 has a sliding fit. A soft rubber washer 23a is disposed against the upper conical side of the plug 23.

The upper end of the tubular post 15 has a sliding fit in the nipple 8. The post 15 is formed with an integral shoulder 15d which is provided with a dovetail recess 15e in which the lower end of the resilient preferably soft rubber sleeve 24 is interlocked.

This resilient rubber sleeve is formed with a slightly tapering inner surface which has a snug sliding fit with the exterior conical surface 25a of the hard rubber sleeve 25, the upper end of which is interlocked with the sleeve 21, and held thereby in spaced relation from the post 15.

The upper end of the tubular post 15 is provided with gauge markings 26, which are arranged in the form of figures giving different degrees of pressure, and as shown indicate pressures rising by five pounds from 25 lbs. to 50 lbs.

When the tire inflating hose is attached to the nipple 8 and air under pressure is forced into the tire it will pass through the central passage of the post 15, thus displacing the valve 17 from its seat, and enter the tire tube 10 by means of the opposed openings 13a and 18a. When inflating pressure is stopped the air under pressure in the inner tube will force the whole tubular plunger 14 outwardly in the tube 5, thereby compressing the main gauge spring 20, and placing the lower rubber sleeve 24 under tension, due to the tapering inner surface thereof being contacted with and forced tight against the exterior conical surface 25a of the sleeve 25. The parts 24 and 25 then form an air-tight joint against air pressure from the tube 5 which may leak, toward the nipple 8, up alongside plunger 14, and which air pressure, because blocked for outlet at the washer 23a, might otherwise leak up alongside post 15 for escape from said nipple. The greater the air pressure in the inner tube the greater will be the outward movement of the tubular plunger. As this plunger moves outwardly it will carry the rod with it.

Air is prevented from leaking through the central passage of the post 15 by the valve 17 when the valve is seated and air is prevented from leaking through the holding tube by the action of the conical plug 23 and the inner and outer washers 22 and 23a. Since the tubular plunger is always under the influence of the tire air pressure its position with reference to the nipple 8 will correctly gauge the force of the tire air pressure.

A dust cap 27 is threaded on the tube 5, which therefore forms a post. This dust cap is provided with the base ring 27a which is internally threaded to engage the external threads of the post 5, and is equipped with the set screw 28. From this base ring the spider or open frame 29 rises, the upper end of which terminates in an integral cap or end wall 29a. Within this frame a transparent tube 30 of celluloid or similar material may desirably be disposed, such tube preferably having a close fit therein. This transparent tube thus employed, will provide a series of transparent observation windows through which the indicated air pressure may be read upon the inner post 15.

The hereinbefore described construction admits of considerable modification without departing from the invention; therefore, I do not wish to be limited to the precise arrangements shown and described, which are, as aforesaid, by way of illustration merely. In other words, the scope of protection contemplated is to be taken solely from the appended claim, interpreted as broadly as is consistent with the prior art.

I claim as new:—

In an air valve comprising a holding tube having a slidable plunger, sliding movement of the plunger being responsive to air pressure in the tube, a sleeve positioned in the tube and relatively slidably engaging the inner wall of the latter and the periphery of the plunger, said sleeve having an annular recess therein, a shoulder on said plunger and having also a recess therein, a rigid tubular member engaged in said first recess and having a free tapered terminal, a resilient tubular member engaged in said second recess and having also a free tapered terminal, said latter terminal being of greater diameter than said first terminal, whereby on relative sliding movement of said plunger and said holding tube, said resilient terminal is effective to embrace said rigid terminal for sealing the joint between said plunger and said sleeve.

In testimony whereof I hereby affix my signature.

FRANK G. ARNOLD.